UNITED STATES PATENT OFFICE.

ROBERT E. SCHMIDT AND PAUL TUST, OF ELBERFELD, GERMANY, ASSIGNORS TO THE FARBENFABRIKEN, VORMALS FR. BAYER & CO., OF SAME PLACE.

ALIZARIN DYE.

SPECIFICATION forming part of Letters Patent No. 496,139, dated April 25, 1893.

Application filed July 20, 1892. Serial No. 440,621. (Specimens.)

*To all whom it may concern:*

Be it known that we, ROBERT E. SCHMIDT and PAUL TUST, (chemists and assignors to the FARBENFABRIKEN, VORMALS FRIEDR. BAYER & Co., in Elberfeld,) subjects of the Emperor of Germany, residing at Elberfeld, Prussia, Germany, have invented a new and useful Improvement in the Manufacture of Alizarine Dye-Stuffs, of which the following is a specification.

Our invention relates to the production of a new valuable alizarine coloring-matter by the oxidation of beta nitroanthrapurpurine. We prepare the latter compound as follows: Ten kilos of anthrapurpurine dried and finely pulverized are mixed with sixty kilos of glacial acetic acid, six kilos of nitric acid at 42° Baumé are allowed to flow slowly and with constant agitation into the above mixture the temperature being kept between 20° and 30° centigrade. According as the nitration proceeds the mass becomes more and more thick, the beta nitroanthrapurpurine formed separating in crystals. As soon as the separation of the latter ceases the whole mass is poured into water, the nitroanthrapurpurine then is filtered off, washed and dried.

In order to carry out our invention practically viz to oxidize the beta nitroanthrapurpurine we proceed as follows: A thorough mixture of ten kilos of beta nitroanthrapurpurine and sixteen kilos of finely pulverized manganese dioxide (containing ninety per cent. of $MnO_2$) is slowly and with continuous stirring introduced into three hundred kilos of sulphuric acid at 66° Baumé, taking care that the temperature does not rise above 20° centigrade. As the reaction proceeds the color of the sulphuric acid solution is changed from brownish-red to strong greenish-blue. The resulting mixture does not contain the complete dye-stuff but an intermediate product thereof which belongs to the series of the so called oxyanthradiquinones. This intermediate product readily dissolves in cold water with violet-red color, and the oxidation of the beta nitroanthrapurpurine is complete when a test portion of the sulphuric acid mixture after pouring into water is dissolved with clear violet-red color.

The transformation of the intermediate product, formed into the dye-stuff itself is based on the property of the former to be changed into the coloring-matter by boiling with water or acids or more practically by treating with reducing agents such as alkaline sulphites, sulphur dioxide and the like. The whole liqquid then is poured into three thousand liters of water mixed with ten kilos of a watery solution of sodium bisulphite at 34° Baumé. After boiling, the coloring-matter separated is filtered off and washed with water, in order to remove the adherent acid.

The dye-stuff obtained in the aforesaid manner forms a brown paste which is almost insoluble in cold water, more readily dissolves in boiling water with bluish-red color. It is soluble with very great ease in acetone; in glacial acetic acid and alcohol it dissolves readily, but less readily in ether. All the resulting solutions possess a beautiful bluish-red color. A concentrated solution in pure concentrated sulphuric acid is of a reddish-violet, while a diluted solution in concentrated sulphuric acid is of a bluish-violet color and becomes greenish-blue after some time. It dissolves in an excess of ammonia liquid with a greenish-blue, in sodium carbonate with a dull violet, in soda-lye with a blue color. When an excess of the latter two reagents viz. sodium carbonate or soda-lye is employed the sodium salt of the dye-stuff which dissolves only with difficulty is separated. It produces on wool mordanted with alumina salts dull violet, on wool mordanted with chromium salts valuable greenish-blue shade.

What we claim as new, and desire to secure by Letters Patent, is—

1. The process for producing a new alizarine dye-stuff by oxidizing beta nitroanthrapurpurine in sulphuric acid solution with manganesedioxide. boiling the formed intermediate product with water, acids, sulphites or bisulphites.

2. The alizarine dye-stuff herein described, obtained by the oxidation of beta-nitro-anthrapurpurine, and which after filtration forms a brown paste almost insoluble in cold water, and more readily in boiling water, with a bluish-red color; easily soluble in acetone, glacial acetic acid and alcohol, but sparingly in ether, which solutions are a bluish-red color, while its concentrated solution in pure concentrated sulphuric acid is reddish-violet, and its dilute solution in concentrated sulphuric acid bluish-violet, changing to greenish-blue; the dye-stuff is soluble in excess of ammonia with greenish-blue, and sodium carbonate with a dull violet, and in soda-lye with a blue color; and on the addition of an excess of the sodium carbonate or soda-lye the difficultly soluble sodium salt of the dye-stuff is separated and the dye produces on wool mordanted with alumina salts dull violet, and on wool mordanted with chromium salts valuable greenish-blue shades.

In testimony whereof we have signed our names in the presence of two subscribing witnesses.

ROBERT E. SCHMIDT.
PAUL TUST.

Witnesses:
RUDOLPH FRICKE,
WM. ESSENWEIN.